O. L. HUFFMAN.
STEERING ATTACHMENT.
APPLICATION FILED JAN. 27, 1920.
1,378,542.
Patented May 17, 1921.
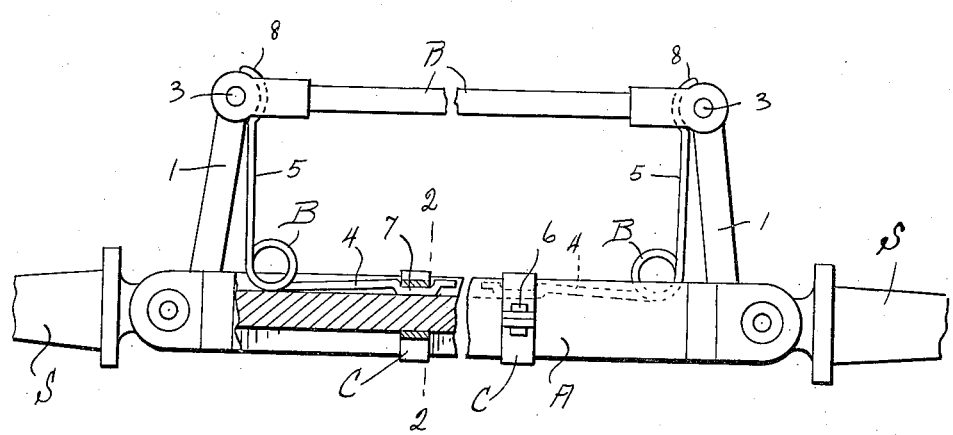
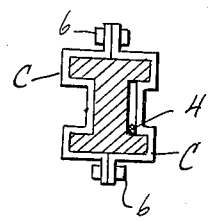
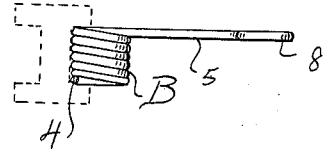
Inventor
O. L. Huffman
By Watson E. Coleman
Attorney

UNITED STATES PATENT OFFICE.

ORLA L. HUFFMAN, OF WEATHERFORD, TEXAS.

STEERING ATTACHMENT.

1,378,542.  Specification of Letters Patent.  Patented May 17, 1921.

Application filed January 27, 1920. Serial No. 354,443.

*To all whom it may concern:*

Be it known that I, ORLA L. HUFFMAN, a citizen of the United States, residing at Weatherford, in the county of Parker and State of Texas, have invented certain new and useful Improvements in Steering Attachments, of which the following is a specification, reference being had to the accompanying drawings.

This invention relates to a novel and improved steering attachment, and it is an object of the invention to provide a device of this general character embodying novel and improved means whereby the steering wheels of a motor driven vehicle or the like are normally maintained straight ahead, and which, at the same time, offer but slight obstruction or resistance to the lateral turning movement of such steering wheels when it is desired to effect a turn in the travel of the vehicle.

Another object of the invention is to provide a novel and improved device of this general character which is carried by an axle of the vehicle and which coacts with a spindle arm whereby the steering wheel concomitant to such arm is normally maintained straight ahead.

The invention consists in the details of construction and in the combination and arrangement of the several parts of my improved attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in top plan and partly in section illustrating a steering attachment constructed in accordance with an embodiment of my invention and in applied position;

Fig. 2 is a sectional view taken substantially on the line 2—2 of Fig. 1; and

Fig. 3 is a fragmentary view partly in side elevation and partly in section of one of my improved attachments, the coacting axle being indicated by dotted lines.

As disclosed in the accompanying drawings, A denotes the front axle of a motor driven vehicle of any ordinary or preferred type and which has operatively engaged with each extremity a spindle S of a conventional type and with which spindle coacts the spindle arm 1. This axle is provided in its front and rear faces with recesses, as is usual.

R denotes a steering rod having one end portion operatively engaged with the outer or free extremity of the arm 1 through the instrumentality of the spindle connecting rod bolt 3.

My improved device comprises a coil spring B of requisite tension and which has its opposite end portions terminating in laterally directed arms 4 and 5, said arms being in angular relation. In applied position, my improved device is positioned adjacent the rear face of the axle A at a point in close proximity to the spindle S and the arm 4 extends inwardly of the recess of the rear face of the axle A and is anchored or clamped thereto through the instrumentality of a clip C surrounding said axle A.

The clip C preferably comprises two substantially duplicate sections shaped to substantially conform to the contour of the axle having their end portions coupled through the medium of the bolts 6. The outer extremity or end portion of the arm 4 extends between the clip C and the rear face of the axle A and such portion is provided intermediate the ends with an inbow or depression 7 in which the clip engages, whereby said arm 4 is effectively maintained against longitudinal movement, or, in other words, has a fixed engagement with the axle A, vertical movement of the spring being prevented by the side walls of the recess.

The second or upper arm 5 extends rearwardly and terminates in a hook 8 which is adapted to be engaged with the spindle connecting rod bolt 3.

The tension of the spring B in connection with the arm 5 serves to normally maintain the spindle S is a position whereby the steering wheel mounted thereon is directed straight ahead so that the control of the vehicle is materially facilitated.

From the foregoing description, it is thought to be obvious that an attachment constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

In combination with an axle provided in one of its faces with a longitudinally disposed recess, a steering spindle carried thereby and a spindle arm coacting with the spindle, a vertically disposed coil spring seated within the recess of the axle and held against vertical displacement by the walls of said recess, said spring being positioned inwardly of but in close proximity to the spindle arm, the opposite end portions of said spring being laterally extended to provide arms, one of said arms extending longitudinally of the axle, the second arm extending in the same general direction as the spindle arm and terminating in a hook bearing against the outer end portion of the spindle arm, and means for clamping the free end portion of the first named arm of the spring to the axle.

In testimony whereof I hereunto affix my signature.

ORLA L. HUFFMAN.